Aug. 18, 1925.
E. E. MULLINS
VALVE OPERATING DEVICE
Filed Oct. 12, 1920
1,550,275
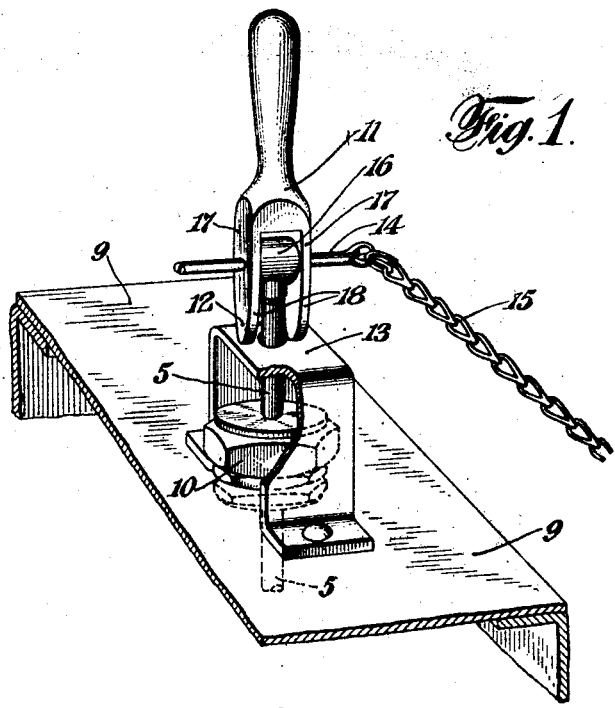
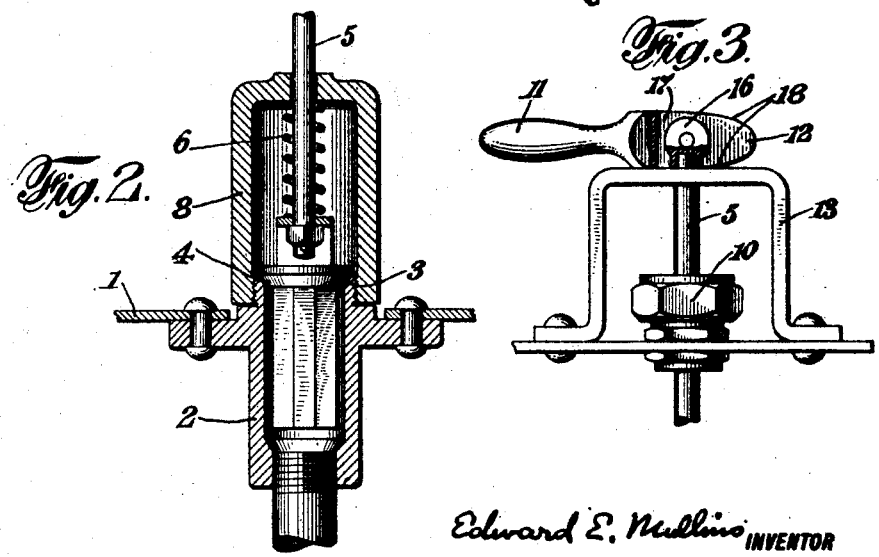
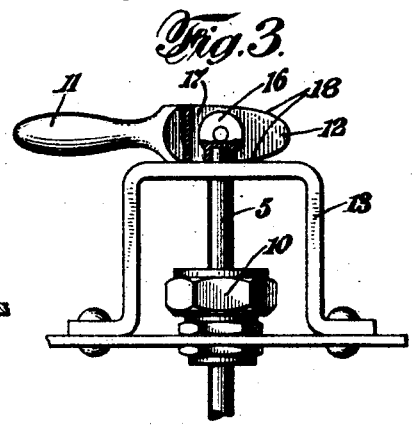
Edward E. Mullins INVENTOR
BY
Prindle, Wright & Small ATTORNEYS Patented Aug. 18, 1925.

1,550,275

UNITED STATES PATENT OFFICE.

EDWARD E. MULLINS, OF HABANA, CUBA.

VALVE-OPERATING DEVICE.

Application filed October 12, 1920. Serial No. 416,568.

*To all whom it may concern:*

Be it known that I, EDWARD E. MULLINS, a citizen of the United States, residing at Habana, Cuba, have invented a certain new and useful Valve-Operating Device, of which the following is a specification.

The invention has for an object to provide a valve operating device which will insure a shifting of the position of the valve, whenever an emergency or safety release member employed in connection therewith, is actuated.

Another object is to combine a valve releasing mechanism with the structure of the valve, in such manner as to render it unlikely that the release would be tampered with or substituted for, to put it out of operation.

Another object of the invention is to provide a valve operating member or handle which may be readily displaced to change the position of the valve, without requiring careful manipulation, for example when the valve is inaccessibly located.

Further objects and advantages of the invention will be in part obvious and in part specifically mentioned in the description hereinafter contained, which, when taken in connection with the accompanying drawings, discloses a preferred embodiment of the invention; such embodiment, however, is to be considered as merely illustrative of its principle. In the drawings:

Fig. 1 is a perspective view showing the valve operating device in position to maintain the valve fully open.

Fig. 2 is a cross sectional view showing a type of valve adapted to be operated by the operating device shown in Fig. 1.

Fig. 3 is a side view of the valve operating device shown in Fig. 1 with the operating handle in the position it assumes when the valve is closed.

The features of this invention are particularly applicable to valves used in connection with tanks, or tank vehicles, such as the tenders for oil burning locomotives. With valves of this character, it is desirable that the supply of fuel be automatically shut off by a suitable release member, whenever the locomotive breaks away from its tender, and it is also desirable that the operator shall not be able to tamper with the release mechanism, or dispense with it, or in any way render it inoperative. As such valves are usually operated from the top of the tank, it is advantageous to construct the valve operating member so that it may be shifted without climbing up onto the tank.

In the present embodiment of the invention, the valve operating device is illustrated as employed in connection with a tank having a bottom wall 1 (Fig. 2), to which is attached a valve housing 2, having a valve seat 3 cooperating with a suitable valve disc 4. Valve rod 5 is connected to the disc 4, and the latter is constantly urged toward one position, in the present instance, closed position, by suitable means such as an expansion spring 6 surrounding the valve rod 5, and abutting against the valve cage 8 in such manner as to urge the valve disc 4 continuously towards its seat 3. As the particular construction of the valve in connection with which the invention is used is not essential, such valve construction will not be described in greater detail, the form of the valve shown being only typical.

In the form illustrated, the valve rod 5 extends through the top wall 9 (Fig. 1) of the tank, passing through a stuffing box 10, whereby the position of the valve in the bottom wall 1 of the tank may be adjusted from the top 9. When the valve is used for such purpose as to permit the flow of fuel to an oil burning locomotive from its tender, the character of the valve-operating device should be such as to automatically release the valve to closed position when the tender is separated from its locomotive, and the release should be so that it cannot be readily altered or dispensed with to render it inoperative.

According to the present invention a release member is so associated with the valve rod 5 and its operating member as to make it necessary for such release member to be in proper position if the operating member is to be manipulated. Or, in other words, if the release member is not in normal position, the operating member is released from the valve rod in such manner that the valve returns to closed position through action of spring 6, and cannot readily be opened again until a release member of proper dimensions is again returned to normal position.

In the illustrated embodiment of the invention, the operating member for the valve is in the form of a rocking handle 11, pivoted to the valve rod 5, and provided with a cam portion 12 which bears against a part on the exterior of the tank, such as bracket 13. In operation the spring 6 keeps the cam portion 12 of the operating handle 11 in engagement with the upper surface of the bracket 13 in such manner that as the operating handle is rocked the valve rod 5 slides up or down as the case may be.

The emergency release member 14 is suitably connected to the locomotive (not shown) by a tension member such as chain 15, and the presence of this emergency release member 14 in normal position is necessary to the functioning of the handle 11. In the present embodiment, the emergency release member takes the form of a pin 14 passing through the arms of the forked handle 11, and through a knuckle 16 on the upper end of valve rod 5, thus forming a pivot on which the handle 11 may rock, and transmitting the movements of the handle 11 to the valve rod 5.

The release member 14 is of such dimensions that when the handle 11 is in "open" position the knuckle 16 will be so positioned as to elevate valve disc 4 the proper amount to produce the desired rate of flow through the valve. But if a pin of materially smaller dimensions than the release member were attempted to be substituted therefor, the proper valve opening would not be secured by operation of the handle 11, and tampering with the valve operating or release member would be discouraged. Furthermore, if it were attempted to substitute a release member of different size than pin 14, operating handle 11 would be loose with regard to such release member and the knuckle 16 when the valve is in closed position, so that the handle might easily fall off. Thus it is not likely that the safety features of the valve operating device could be dispensed with without rendering the same practically inoperative.

In case the tender should separate from its locomotive with the valve fully open, the strain on a tension member shown in the form of a chain 15 will withdraw release member 14 from its normal position as a connecting element between the handle 11 and valve rod 5, with the result that handle 11 will be detached from the valve rod, and spring 6 immediately move valve disc 4 to closed position against the valve seat 3.

Since when a valve operating device of the above character is employed in connection with tanks. the operating member will often be so inaccessibly located as to render manual manipulation difficult, the valve operating device is preferably so arranged according to the present invention, that a blow or slight displacement of the operating handle when the valve is in open position will be sufficient to close the valve without requiring careful manipulation.

In the present instance the operating handle 11 has two arms 17, each provided with a cam portion 12 which acts as a fulcrum or bearing point upon the bracket 13 when the handle is rocked to raise the valve rod. When the handle is in upright position such that its fulcrum point is substantially alined with the valve rod, the spring 6 holds the handle 11 in such position and the valve is maintained open. However, the cam portion 12 is provided with an abrupt sloping surface 18 either side of its central fulcrum point such that when the operating handle 11 is slightly displaced from position in alinement with the valve rod 5, the tension of spring 6 pulls the handle down to "closed" position, thus enabling the valve to be readily closed by a blow from a rod, or some similar instrument. If desired, the weight of the handle portion may be such as to over-balance the weight of the cam portion 12 thereof, so that the handle itself will tend to fall to "closed" position whenever displaced to any extent from alinement with the valve rod 5.

While a specific embodiment of the invention is described, it will be obvious that many changes may be made without departing from the spirit of the invention as defined in the appended claims.

I claim:

1. The combination with a tank valve constantly urged toward one position and having a valve rod adapted to extend to the exterior of the tank, of an exterior operating member associated with said valve rod adapted to shift the same to move said valve to another position, an emergency release member associated with said operating member and bodily removable therefrom when actuated, said release member when in unreleased position maintaining said operating member in operative relation to said valve rod and means whereby the actuation of said release member frees said valve rod from said operating member to permit the valve to move to its first mentioned position.

2. The combination with a tank valve constantly urged toward one position and having a valve rod adapted to extend to the exterior of the tank, of an exterior operating member associated with said valve rod, said operating member having a cam surface adapted to cooperate with an exterior part on the tank, to shift said valve rod and move the valve to another position, an emergency release member associated with said operating member, said release member when in unreleased position maintaining said operating member in operative relation to said valve rod and when actuated being bodily removable from the operating member, and means whereby the actuation of said release member frees said valve rod from said operating member to permit the valve to move to its first mentioned position.

3. The combination with a tank valve constantly urged toward one position and having a slidable valve rod adapted to extend to the exterior of the tank, of an exterior operating member associated with said valve rod adapted to shift the same to move said valve to another position, and a strain detachable emergency release member operatively engaging said operating member with said valve rod and a tension member attached to said release member, said tension member being connected to the valve structure only through the medium of the release member and being entirely releasable from said valve rod, whereby strains on said tension member may cause the latter to separate to any distance from the valve rod.

4. The combination with a tank valve constantly urged toward one position and having a slidable valve rod adapted to extend to the exterior of the tank, of an exterior rocking operating handle associated with said valve rod and having a cam surface adapted to cooperate with an exterior part on the tank to shift said valve rod and move the valve to another position, and a strain detachable emergency release member passing through said valve rod and forming a pivot for said rocking operating handle.

5. The combination with a tank valve constantly urged toward closed position and having a slidable valve rod adapted to extend to the exterior of the tank, of an exterior rocking operating handle for said valve and adapted to shift the same to move said valve to open position, a strain detachable emergency release member connecting said handle to said valve rod and a tension member attached to said release member, said tension member being connected to the valve structure only through the medium of the release member and being entirely releasable from said valve rod, whereby strains on said tension member may cause the latter to separate to any distance from the valve rod.

In testimony that I claim the foregoing, I have hereunto set my hand this 4 day of October, 1920.

EDWARD E. MULLINS.